US012783307B2

(12) United States Patent
Jeon

(10) Patent No.: US 12,783,307 B2
(45) Date of Patent: Nov. 3, 2026

(54) MEMORY STABILITY DETERMINATION APPARATUS, METHOD OF DETERMINING STABILITY OF MEMORY ALLOCATION CODE BY DETECTING ATYPICAL MEMORY ALLOCATION CODE, AND COMPUTER PROGRAM

(71) Applicant: UNIST(ULSAN NATIONAL INSTITUTE OF SCIENCE AND TECHNOLOGY), Ulsan (KR)

(72) Inventor: Yuseok Jeon, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 446 days.

(21) Appl. No.: 18/382,187

(22) Filed: Oct. 20, 2023

(65) Prior Publication Data

US 2024/0202029 A1 Jun. 20, 2024

(30) Foreign Application Priority Data

Dec. 20, 2022 (KR) ........................ 10-2022-0179795

(51) Int. Cl.
*G06F 9/50* (2006.01)

(52) U.S. Cl.
CPC .................................. *G06F 9/5016* (2013.01)

(58) Field of Classification Search
CPC ...... G06F 3/0631; G06F 3/0604; G06F 3/064; G06F 3/0674; G06F 12/0253; G06F 12/0246; G06F 2212/7202
See application file for complete search history.

(56) References Cited

U.S. PATENT DOCUMENTS 12,189,969 B2 * 1/2025 Zhou ..................... G06F 3/0614
12,524,160 B2 * 1/2026 Zhang ................... G06F 3/0617

FOREIGN PATENT DOCUMENTS

KR 10-2019-0079809 7/2019

OTHER PUBLICATIONS

Office Action and English Translation received in Korea Application No. 10-2022-0179795, dated Aug. 17, 2024, 12 pages.
Hong et al., "A study of strengthening memory safety through CMA recognition," Journal of the Society for Information protection, vol. 2, No. 4, Aug. 2022, 10 pages. (English Abstract).

* cited by examiner

*Primary Examiner* — Andy Ho
(74) *Attorney, Agent, or Firm* — Klarquist Sparkman, LLP

(57) ABSTRACT

A method of determining stability of a memory allocation code includes inputting, by a memory stability determination apparatus, a program to a classifier and detecting a custom memory allocation code, inserting, by the memory stability determination apparatus, a first function to increase a memory chunk to be allocated by a set size and allocate the memory chunk and a second function to poison an increased region with a garbage value, to a point preceding the custom memory allocation code, runtime executing, by the memory stability determination apparatus, a program into which the first function and the second function are inserted, to detect an access to a poisoned region poisoned with the garbage value, and determining, by the memory stability determination apparatus, that security of the custom memory allocation code is weak when the access to the poisoned region is true (1).

11 Claims, 8 Drawing Sheets

FIG. 7

| ALLOCATOR | PATTERN | CHUNK POINTER | CHUNK TYPE | VULNERABILITY | RELATED ART | PROPOSED DISCLOSURE |
|---|---|---|---|---|---|---|
| ngx_pool | Pool | p3 | (d) | LEFT OVERFLOW | X | O |
| ngx_pool | Pool | p3 | (d) | RIGHT OVERFLOW | X | O |
| ngx_pool | Pool | p4 | (b) | LEFT OVERFLOW | X | X |
| Aligned | Padding | p1 | (i) | LEFT OVERFLOW | X | X |
| Aligned | Padding | p1 | (i) | RIGHT OVERFLOW | X | O |
| LowLevel | Freelist | p8 | (g) | RIGHT OVERFLOW | X | O |

MEMORY STABILITY DETERMINATION APPARATUS, METHOD OF DETERMINING STABILITY OF MEMORY ALLOCATION CODE BY DETECTING ATYPICAL MEMORY ALLOCATION CODE, AND COMPUTER PROGRAM

CROSS-REFERENCE TO RELATED APPLICATIONS

This application is based on and claims priority under 35 U.S.C. § 119 to Korean Patent Application No. 10-2022-0179795, filed on Dec. 20, 2022, in the Korean Intellectual Property Office, the disclosure of which is incorporated by reference herein in its entirety.

BACKGROUND

1. Field

The disclosure relates to a memory stability determination apparatus, a method of determining the stability of a memory allocation code by detecting an atypical memory allocation code, and a computer program, and more particularly, to detecting an atypical memory allocation code included in a program by using a machine-trained classifier and determining the stability of the memory allocation code.

2. Description of the Related Art

C and C++ are the most widely used languages for system software such as operating systems, firmware, etc., due to their fast performance and high degree of freedom. However, C and C++ do not provide perfect security and have memory vulnerabilities such as buffer overflow, use after free, etc. An address sanitizer is one of the most frequently used tools for detecting such memory vulnerabilities with a relatively low overhead and a high detection rate.

In various application programs, a custom memory allocator (CMA) is used to efficiently use a memory, and an existing memory error detector such as an address sanitizer, etc., is not able to detect object-related memory safety violation vulnerabilities occurring from the CMA.

HOTracer has been introduced as a tool (program) for catching a bug derived from the CMA. This HOTracer is designed to derive a heuristic-based behavioral pattern and detect the CMA based thereon to trace a pointer and an access range derived from the CMA and an access range, thus finding a heap buffer overflow. However, when such a heuristic-based detection method is used, some CMAs may not be detected depending on an implementation scheme of the CMA.

Hence, a need for a tool for detecting memory vulnerabilities existing in the CMA is increasing.

SUMMARY

Provided are an apparatus and method for detecting an atypical memory allocation code included in a program using whether the code corresponds to a memory allocation code from a machine-trained classifier, and determining stability of the memory allocation code, and a computer program.

Additional aspects will be set forth in part in the description which follows and, in part, will be apparent from the description, or may be learned by practice of the presented embodiments.

A method of determining stability of a memory allocation code includes inputting, by a memory stability determination apparatus, a program to a classifier and detecting a custom memory allocation code, inserting, by the memory stability determination apparatus, a first function to increase a memory chunk to be allocated by a set size and allocate the memory chunk and a second function to poison an increased region with a garbage value, to a point preceding the custom memory allocation code, runtime executing, by the memory stability determination apparatus, a program into which the first function and the second function are inserted, to detect an access to a poisoned region poisoned with the garbage value, and determining, by the memory stability determination apparatus, that security of the custom memory allocation code is weak when the access to the poisoned region is true (1).

The classifier may output whether a code corresponds to a custom memory allocation code, by using an artificial neural network trained with custom memory allocation codes.

According to embodiments, when the first function is executed, a sum of a first size to be allocated by the custom memory allocation code and a set second size may be output.

According to embodiments, when the second function is executed, a memory chunk corresponding to a return value of the first function may be allocated by the custom memory allocation code and a garbage value may be recorded on a region of the second size.

According to embodiments, the method may further include generating, by the memory stability determination apparatus, information about an allocation code having weak security as output data.

A computer program according to an embodiment may be stored in a medium to execute any one of methods according to an embodiment by using a computer.

In addition, another method and another system for implementing the disclosure, and a computer-readable recording medium for recording a computer program for executing the method may be further provided.

Other aspects, features, advantages, and advantages other than those described above will become apparent from the following figures, claims, and the detailed description of the disclosure.

BRIEF DESCRIPTION OF THE DRAWINGS

The above and other aspects, features, and advantages of certain embodiments will be more apparent from the following description taken in conjunction with the accompanying drawings, in which:

FIG. 7 is a table comparing a vulnerability discovered according to an embodiment with a vulnerability discovered according to an original method.

DETAILED DESCRIPTION

Figure 1:
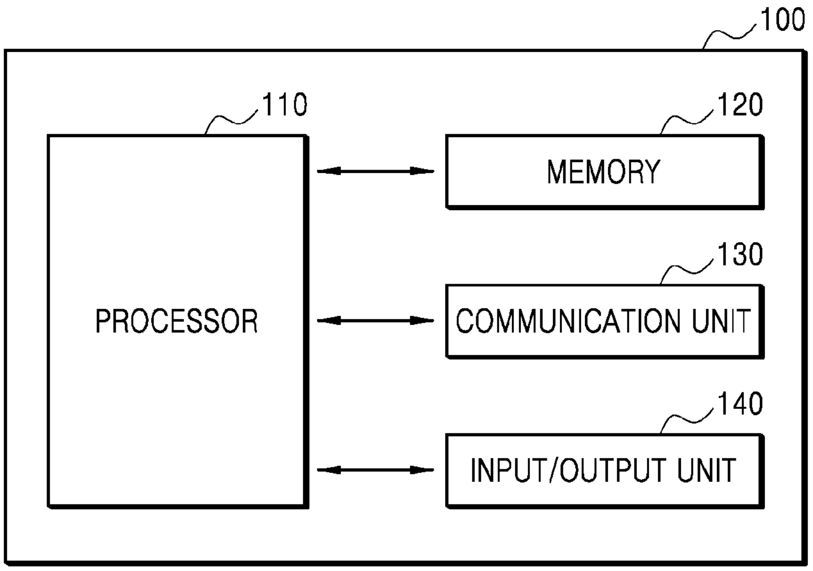
FIG. 1 is a block diagram of a memory stability determination apparatus according to embodiments.

Reference will now be made in detail to embodiments, examples of which are illustrated in the accompanying drawings, wherein like reference numerals refer to like components throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of components, modify the entire list of components and do not modify the individual components of the list.

Hereinafter, the configuration and operation of the disclosure will be described in detail with reference to embodiments shown in the accompanying drawings.

The disclosure may have various modifications thereto and various embodiments, and thus particular embodiments will be illustrated in the drawings and described in detail in a detailed description. Effects and features of the disclosure, and a method of achieving them will be apparent with reference to the embodiments described in detail in conjunction with the drawings. However, the disclosure is not limited to the embodiments disclosed below, but may be implemented in various forms.

Hereinafter, embodiments will be described in detail with reference to the accompanying drawings, and in description with reference to the drawings, the same or corresponding components are given the same reference numerals, and redundant description thereto will be omitted.

Herein, the terms "training", "learning", etc. will be interpreted as terms referring to performing machine learning through computing according to a procedure rather than intended to indicate mental operations such as human educational activities.

In the following embodiments, the terms first, second, etc., have been used to distinguish one component from other components, rather than limiting.

In the following embodiment, singular forms include plural forms unless apparently indicated otherwise contextually.

In the following embodiments, the terms "include", "have", or the like, are intended to mean that there are features, or components, described herein, but do not preclude the possibility of adding one or more other features or components.

In the drawings, the size of components may be exaggerated or reduced for convenience of description. For example, the size and thickness of each component shown in the drawings are shown for convenience of description, and thus the disclosure is not necessarily limited to the illustration.

When a certain embodiment may be implemented otherwise, a particular process order may be performed differently from the order described. For example, two processes described in succession may be performed substantially simultaneously, or may be performed in an order reverse to the order described.

Herein, machine learning is a method for inferring a function from training data, and may include one of supervised learning, unsupervised learning, reinforced learning, etc.

Herein, an artificial neural network is a statistical learning algorithm inspired by a neural network of biology in machine learning and cognitive science, and refers to a model in which artificial neurons, which form a network by coupling synapses, change synapse coupling strength through learning to have problem-solving abilities.

Herein, a memory overflow security vulnerability is a weakness used by an attacker to lower information assurance of a system, and may include, for example, vulnerabilities related to the memory. The memory-related vulnerability may refer to a case where a material is read from or written in a position beyond the range of the allocated memory in a program using a contiguous memory space. Malfunction may occur or a malicious code may be executed in a program having a memory overflow security vulnerability. The memory overflow security vulnerability may include a stack memory buffer overflow, a heap memory buffer overflow, etc.

A program for diagnosing such a memory overflow security vulnerability may detect a memory overflow security vulnerability existing in a buffer region by determining whether a value recorded in recording of a value in the buffer region is greater than a size of the buffer region. Various forms of memory allocation codes may be included in the implemented program, and the program for diagnosing the memory overflow security vulnerability may not be able to detect an atypical memory allocation code other than a typical memory allocation code.

The atypical memory allocation code may refer to a custom memory allocation code (a custom memory allocator (CMA)), and may include a code of a pool pattern type, a code of a freelist pattern type, a code of a left padding pattern, a code of a right padding pattern, etc. Herein, the custom memory allocation code may refer to a code implemented using a malloc function and a memory allocator, instead of provided from a standard library.

Herein, an overflow may refer to an error (a bug) occurring as data is stored beyond a storage region of the memory during program execution.

FIG. 1 is a block diagram of a memory stability determination apparatus according to embodiments.

A memory stability determination apparatus 100 according to embodiments may determine whether a code is a memory allocation code by using a machine-trained classifier. The memory allocation code existing in the program may be classified using a classifier. The memory stability determination apparatus 100 may determine whether the memory allocation code detected by the classifier has a security vulnerability.

A padding region may refer to a memory chunk region, etc., of a size greater than a size set by a code. According to embodiments, a code for being allocated with a padding region from a standard allocator and returning (not to be allocated with) a non-padding region except for the padding region may be included. Such a code may include a code of a left padding pattern type, a code of a right padding pattern type, etc. By using this code, the non-padding region except for the padding region may be returned, thus returning an unallocated region rather than an allocated region. An overflow for the padding region may not be detected.

Figure 6A:
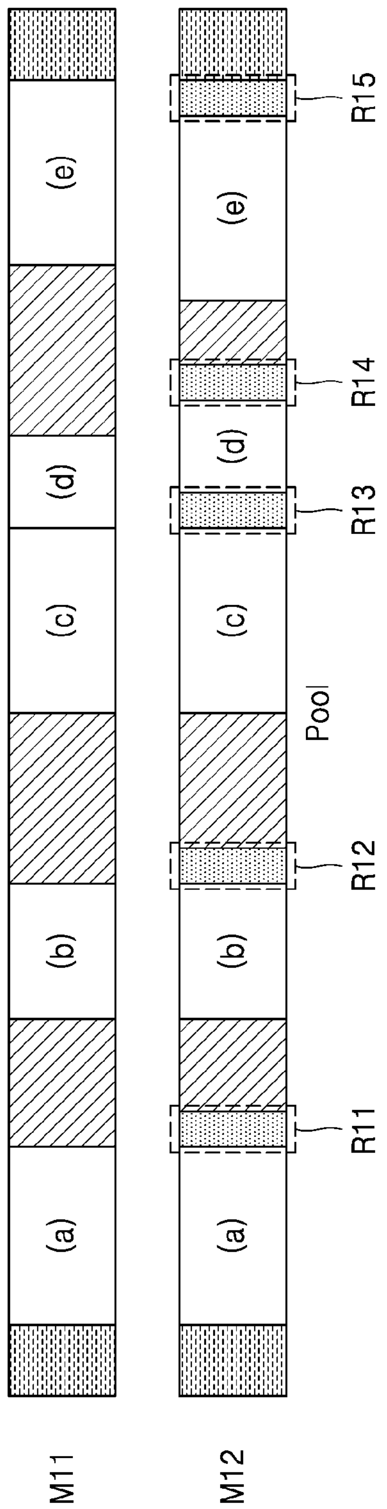
FIG. 6A illustrates an example of memory allocation of a pool pattern type.

According to embodiments, in relation to a pool pattern type, a padding region of the pool pattern type may include one memory chunk. In the padding region of the pool pattern type, one or more memories may be allocated for data during program execution. In this case, an overflow entering an unallocated region inside the padding region of the pool pattern type may not be detected. Referring to FIG. 6A, in a padding region of the pool pattern type, five data such as (a), (b), (c), (d), (e), etc., may be allocated. When data is allocated, it may mean that a region for the data is allocated. Between allocated (a), (b), (c), (d), and (e), regions not allocated with data on a program may exist and such regions not allocated with data may be written or recorded. When data is allocated to a memory of an unallocated region, it may mean that a memory overflow occurs.

Figure 6B:
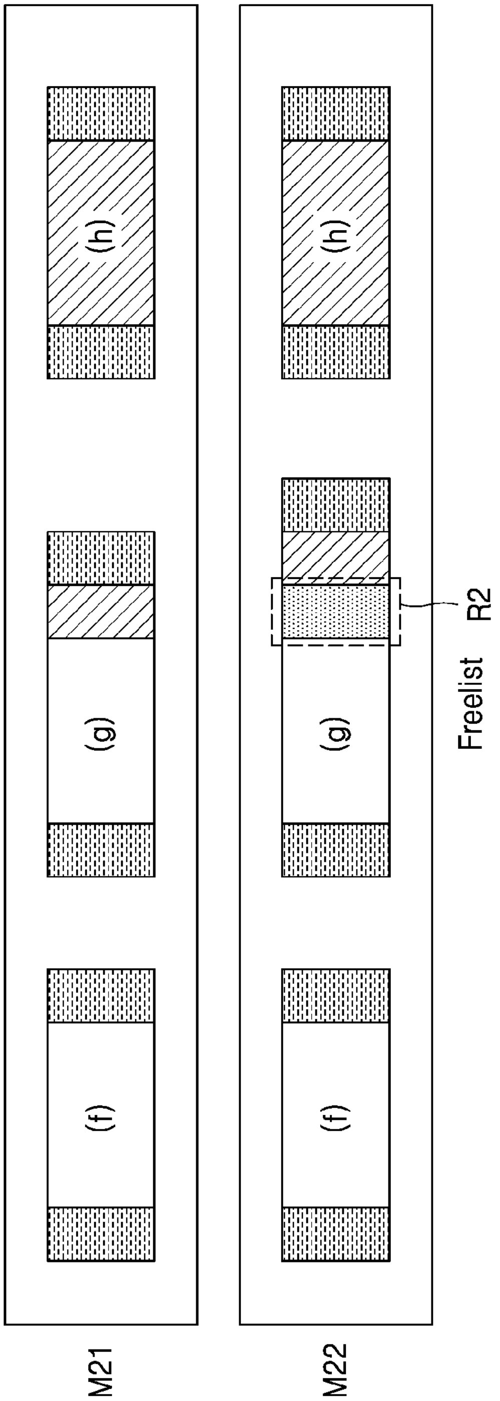
FIG. 6B illustrates an example of memory allocation of a freelist pattern type.

For a padding region of the freelist pattern type, a memory chunk may be allocated according to execution of the program, and afterwards, when release of the memory chunk is requested by the program, information about the memory chunk (a position, an address, etc.) may be added to a separate list for reuse in future memory allocation. For the padding region of the freelist pattern type, a first-fit algorithm, a best-fit algorithm, and a worst-fit algorithm may be used. Referring to FIG. 6B, in a case like (g) where a memory of the freelist pattern type includes an unallocated region, data writing to a region not allocated with data may not be detected as an overflow.

The memory stability determination apparatus 100 according to embodiments may detect a memory allocation code corresponding to the pool pattern type, the freelist pattern type, the left padding pattern type, the right padding pattern type, etc., instead of a typical memory allocation code, by using a classifier, and detect a memory overflow vulnerability for the detected memory allocation code.

The memory stability determination apparatus 100 according to embodiments may allocate a memory chunk of a size requested by a code, increase the memory chunk by a set red zone size and allocate the increased memory chunk, and poison a region of the red zone size with a garbage value to detect an overflow vulnerability based on whether the poisoned region is accessed. The memory stability determination apparatus 100 according to embodiments may insert a first runtime function to increase a memory chunk size factor (value) by a set red zone size and insert a second runtime function to poison a region of the red zone size increased after the first runtime function. The memory stability determination apparatus 100 may separately memorize position information (an address value, a position value, etc.) of the inserted poisoned region and detect an access to the poisoned region inserted by memory allocation, by using the position information. Whether the poisoned region is accessed may indicate whether data, a value, etc., are recorded in the poisoned region. When there is any access or recording to the poisoned region, it may be determined that there is no stability of the memory allocated by the memory allocation code. When there is no stability of the memory allocation code, it may be determined that a vulnerable memory allocation code is included.

The memory stability determination apparatus 100 may include a processor 110, a memory 120, a communication unit 130, and an input/output unit 140.

According to an embodiment, the processor 110 may generally control an overall operation of the memory stability determination apparatus 100. For example, the processor 110 may control in overall components included in the memory stability determination apparatus 100 by executing a program stored in the memory stability determination apparatus 100.

The processor 110 may detect a memory allocation code corresponding to the pool pattern type, the freelist pattern type, the left padding pattern type, the right padding pattern type, etc., rather than a typical memory allocation code by using a classifier, and detect a memory overflow vulnerability for the detected memory allocation code. Herein, the classifier may be a component for detecting a custom memory allocation code and may be implemented as software or hardware. The classifier may refer to a module with a program as an input and information (a file name, the number of lines, etc.,) about a custom memory allocation code in the program as an output. The classifier may use the trained artificial neural network. The classifier may determine whether each code of the program corresponds to the custom memory allocation code based on whether the code corresponds to a predefined rule.

The processor 110 may allocate a memory chunk of a size requested by a code, increase the memory chunk by a red zone size and request the same, and detect an overflow vulnerability of recording a region of the red zone size in the extended memory chunk with a set garbage value, e.g., 0xff. Recording of a garbage value on a certain region may mean poisoning the certain region.

The processor 110 may insert the first runtime function to increase a size factor (value) of the memory chunk by a set red zone size and insert the second runtime function to poison a region increased after the first runtime function. The processor 110 may separately memorize the position information of the inserted poisoned region and determine a vulnerability of the memory allocation code by using whether the poisoned region inserted by memory allocation is accessed.

According to an embodiment, the memory 120 may store a program for processing and controlling the processor 110, and store data input to or output from the memory stability determination apparatus 100. According to an embodiment, the memory 120 may store a component required for memory stability determination and store information about memory stability determination. The memory 120 may store a program requiring memory stability determination and store a configuration for static analysis and/or dynamic analysis of a program, a configuration for monitoring execution of a program, etc. The memory 120 may include a database storing the foregoing information.

According to an embodiment, the memory 120 may include a storage medium of at least one type of a flash memory type, a hard disk type, a multimedia card micro type, a card type memory (e.g., a secure digital (SD) or extreme digital (XD) memory, etc.), random access memory (RAM), static random-access memory (SRAM), read-only memory (ROM), electrically erasable programmable read-only memory (EEPROM), programmable read-only memory (PROM), magnetic memory, a magnetic disk, or an optical disk. According to an embodiment, programs stored in the memory 120 may be classified into a plurality of modules depending on their functions.

According to an embodiment, the communication unit 130 may communicate with an external device of the processor 110. For example, the communication unit 130 may perform communication with an electronic device storing security-required program, under control of the processor 110. The communication unit 130 may access the electronic device storing the security-required program through communication with an external interface and perform communication to analyze the program and establish a security policy for the program.

The input/output unit 140 may be a means for an interface with an input/output device. For example, the input device may include a keyboard, a mouse, etc., and the output device may include a display for displaying a communication session of an application, etc. In another example, the input/output unit 140 may be a means for an interface with a device in which a function for input and a function for output are integrated into one, such as a touch screen. More specifically, when the processor 110 of the memory stability determination apparatus 100 is loaded on the memory 120 or processes a command of a stored computer program, a service screen or content may be displayed on a display through the input/output unit 140.

Moreover, in other embodiments, the memory stability determination apparatus 100 may include more components than those of FIG. 1. For example, the memory stability determination apparatus 100 may be implemented to include at least a part of the input/output device or may further include other components such as a battery and a charging device that supply power to internal components, various sensors, a database, etc.

Figure 2:
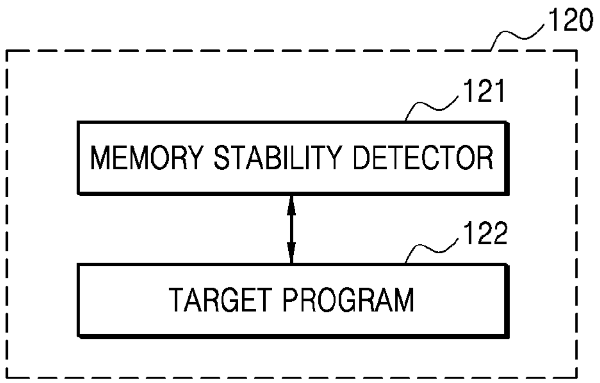
FIG. 2 is a block diagram of a memory.

FIG. 2 is a block diagram of the memory 120.

The memory 120 may include a memory stability detector 121 and a target program 122 for detecting memory stability.

The memory stability detector 121 may read the target program 122 according to a user's instruction or a program's instruction to detect a custom memory allocation code from the target program 122, and determine whether the custom memory allocation code has a memory overflow vulnerability. The memory stability detector 121 may generate and provide result data including information about the detected vulnerability. The result data may include whether a vulnerability such as a memory overflow, etc., occurs due to execution of the target program and information (a position, a file, a function, data, etc.,) about a code having a vulnerability occurred.

The memory stability detector 121 may detect a memory allocation code corresponding to the pool pattern type, the freelist pattern type, the left padding pattern type, the right padding pattern type, etc., rather than a typical memory allocation code by using a classifier, and detect whether a memory overflow vulnerability is included for the detected memory allocation code. The memory stability detector 121 may detect whether a vulnerability is included such as whether a memory overflow occurs due to execution of the memory allocation code. Herein, the classifier, which is a model trained with custom memory allocation codes, may output whether a code corresponds to a custom memory allocation code by using the trained artificial neural network.

Learning data input to train the classifier may be an intermediate representation (IR) code from which some unnecessary codes are removed. The classifier may use a recurrent neural network (RNN) trained by embedding each command based on the IR code. The IR code may refer to a low-level intermediate representation code. A program implemented in a programming language may be converted into a low-level intermediate representation code via a high-level intermediate representation code through a compiler.

The memory stability detector 121 may allocate a memory chunk of a size requested by a code, increase the memory chunk by a red zone size, record a preset garbage value on a region of the increased memory chunk, and identify values of the region of the memory chunk after using the memory allocation code to detect a vulnerability such as whether a memory overflow occurs, etc. Recording of the preset garbage value on the region of the memory chunk region may be expressed as poisoning the region of the memory chunk.

More specifically, the memory stability detector 121 may insert the first runtime function to increase a memory chunk size factor other than a memory region allocated in the memory allocation code by a red zone that is a set region. The first runtime function may output a sum of a first size, which has to be allocated by the custom memory allocation code, and a set second size.

The memory stability detector 121 may insert the second runtime function to poison the red zone that is a region increased after the first runtime function. Herein, the red zone, which is the increased region, may refer to a region of the second size. The red zone poisoned by the second runtime function may be referred to as a poisoned region. The memory stability detector 121 may insert a runtime function to release the red zone that is the added poisoned region, in front of a calling code of a release function. The memory stability detector 121 may separately memorize position information of the inserted poisoned region and determine whether a vulnerability such as a memory overflow, etc., occurs for the memory allocation code, by using whether the poisoned region inserted by memory allocation is accessed.

Figure 3:
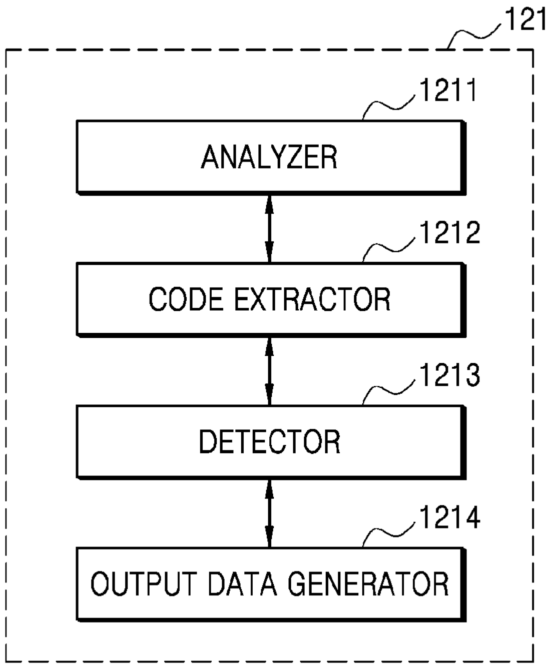
FIG. 3 is a block diagram of a memory stability detection unit.

FIG. 3 is a block diagram of the memory stability detection unit 121.

The memory stability detector 121 may include an analyzer 1211, a code extractor 1212, a detector 1213, and an output data generator 1214.

The analyzer 1211 may run-time execute a target program for which a memory overflow vulnerability is to be detected.

The code extractor 1212 may read instructions of the target program to detect the custom memory allocation code. The code extractor 1212 may classify the custom memory allocation code as an allocation code and a release code. The code extractor 1212 may classify the custom memory allocation code as one of an allocation code, a release code, and a typical memory allocation code by using the classifier.

The detector 1213 may add one or more functions to detect a vulnerability in the custom memory allocation code detected through the code extractor 1212. The detector 1213 may detect a vulnerability of the custom memory allocation code by using the added functions.

The detector 1213 may insert the first runtime function to increase a size factor (value) of the memory chunk other than a memory region allocated by the allocation code by a red zone of a set size so as to detect a vulnerability of the allocation code of the custom memory allocation code. The first runtime function may output a sum of the first size, which has to be allocated by the custom memory allocation code, and the set second size.

The detector 1213 may insert the second runtime function to poison the red zone that is a region increased after the first runtime function. The poisoned region may be inserted to a right side of the memory chunk by the second runtime function. Herein, insertion of the poisoned region may refer to recording a certain value on the region. The second runtime function may allocate a memory chunk corresponding to a return value of the first runtime function by the custom memory allocation code and record a certain garbage value on the region of the second size. The second size may refer to a value except for a size that has to be allocated by the custom memory allocation code in the return value of the first runtime function. The detector 1213 may insert a third runtime function to release a region allocated after increased by a red zone, in front of a called code of the release function.

Referring to FIG. 6A, memory allocation of a pool pattern may refer to allocation of (a), (b), (c), (d), and (e) to one memory pool like M11.

When regions (a), (b), (c), (d), and (e) are allocated by the memory allocation code of the pool pattern, the detector 1213 may insert poisoned regions R11, R12, R13, R14, and R15 in adjacent to the regions (a), (b), (c), (d), and (e) through the first and second runtime functions, as indicated by M12. Through execution of the first and second runtime functions, poisoned regions may be inserted to the right of the regions (b), (c), (d), and (e). The poisoned regions R11, R12, R13, R14, and R15 may be implemented to be disposed between (a), (b), (c), (d), and (e). The detector 1213 may detect whether a right overflow of a memory allocation code is detected through whether the poisoned regions R11, R12, R13, R14, and R15 are accessed.

A region to the left of the memory chunk may be a region having a greater address value than address values of the memory chunk. When an address value increases in the right direction, a region to the right of the memory chunk may refer to a region having a greater address value than the memory chunk. When an overflow occurs during program execution, data may be stored up to a region beyond the allocated region. Thus, to detect the overflow, it is detected whether a garbage value is recorded on the right region having the greater address value. A position of a region where the garbage value is recorded may change with a memory use scheme. Referring to FIG. 6B, a freelist pattern may refer to independently allocating (f), (g), and (h) to a free region of a memory region, as indicated by M21.

When there are memory chunks (f), (g), and (h) as the memory allocation code of the freelist pattern type, the memory chunk (f) may be the best-fit allocated memory chunk, the memory chunk (g) may be the best-fit or worst-fit allocated memory chunk, and the memory chunk (h) may be a memory chunk in a released state. The detector 1213 may insert a poisoned region R2 into a region to the right of the best-fit allocated memory chunk (g) as indicated by M22, and detect a vulnerability of the memory allocation code based on whether the poisoned region R2 is accessed. The right region may refer to a region having the greater address value when the address of the memory is configured to increase from the left to the right. In the opposite case, the right region may refer to a region having the less address value.

Herein, the best-fitting may refer to scanning the memory and allocating a region for data to an allocatable region first found. The best-fitting may refer to scanning the memory and allocating a region for data to a region having the closest size to a size to be allocated from among free regions. The worst-fitting may refer to scanning the memory and allocating a region for data to the largest region among the free regions.

Figure 6C:
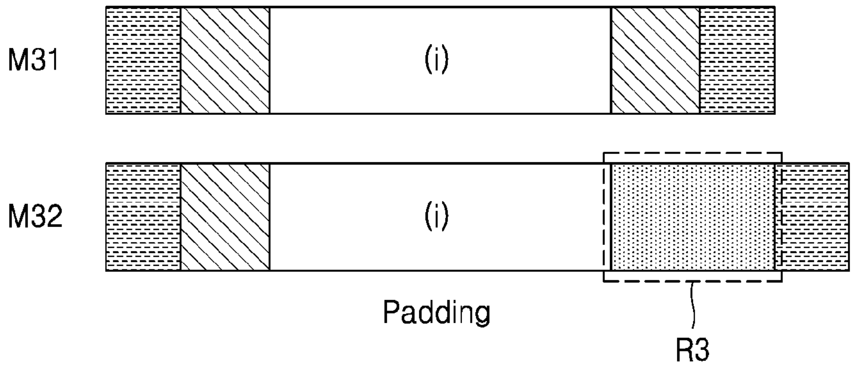
FIG. 6C illustrates an example of memory allocation of a padding pattern type.

Referring to FIG. 6C, for a memory chunk (i) as the memory allocation code of the padding pattern type, the detector 1213 may insert a poisoned region R3 to the right side of the memory chunk (i).

The detector 1213 may detect a vulnerability of a custom memory allocation code based on whether a poisoned region is accessed. When a first poisoned region is inserted to the right of a first allocation code and an access signal to the first poisoned region is detected during program execution, then it may be determined that there is or exists a security vulnerability in the first allocation code. The access signal to the first poisoned region may be determined based on whether data is recorded on the first poisoned region.

The output data generator 1214 may generate information about an allocation code having a security vulnerability as output data. When determining that security of the allocation is weak, the output data generator 1214 may generate the information about the custom memory allocation code having the weak security as output data. The generated output data may be displayed through an output device.

Figure 4:
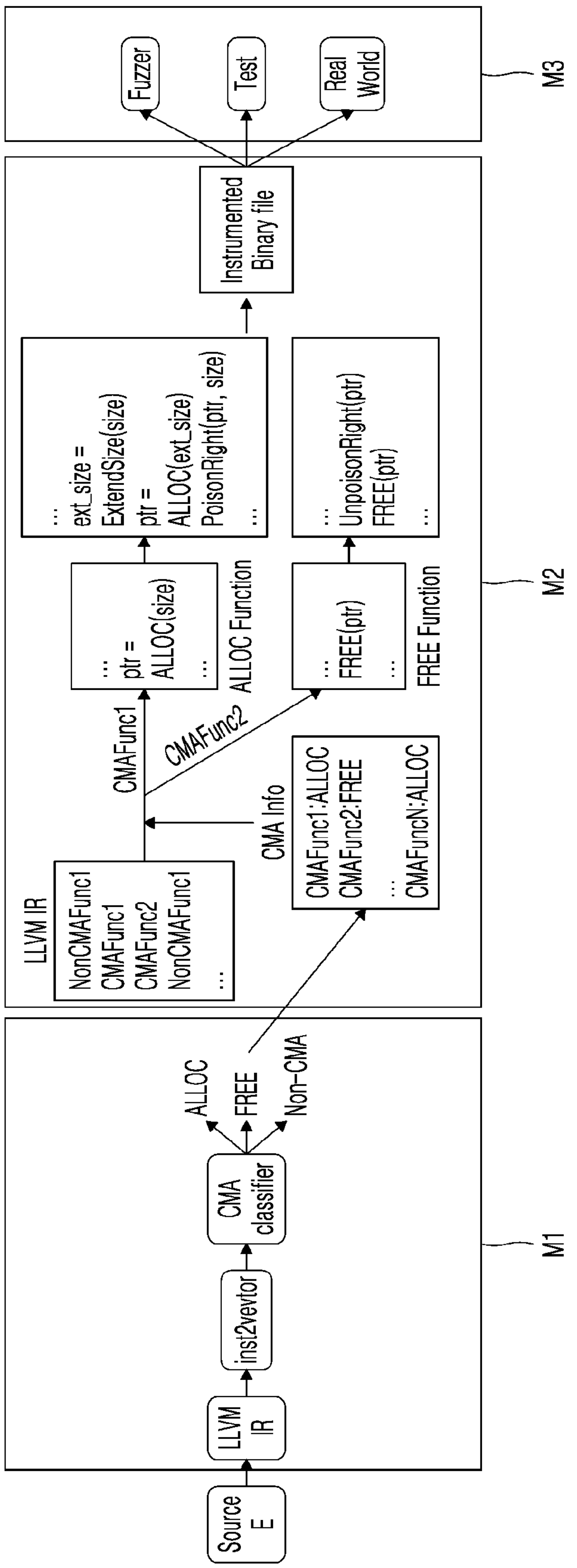
FIG. 4 illustrates an example of a memory stability determination apparatus according to embodiments.

FIG. 4 illustrates an example of a memory stability determination apparatus according to embodiments.

M1 of the memory stability determination apparatus 100 according to embodiments may detect the custom memory allocation code by inputting the program to the classifier. The memory stability determination apparatus 100 may train the classifier by establishing a dataset for freelist and pool allocators included in eight programs such as Arrow, leveldb, nginx, scipy, etc. The memory stability determination apparatus 100 may train an artificial neural network such as an RNN, etc., by embedding each command in a specific manner based on a code.

M2 of the memory stability determination apparatus 100 may add one or more runtime functions to a position preceding or following an allocation code Alloc and a release code Free, in case of runtime execution. The preceding position may refer to a position on a program, executed first, in program execution, and the following position may refer to a position on the program, executed later, in program execution. More specifically, M2 may insert a function ExtendSize to increase a size factor of an allocation code to a point preceding the allocation code. A specific red zone may be added through the function ExtendSize. M2 may insert a function Poison Right to poison the right to the memory chunk at a point following the allocation code such that the function may be executed in runtime execution. The function Poison Right may poison the red zone to turn the same into a poisoned region. M2 may store position information of the poisoned region that is the added red zone as metadata, implement a function UnPoisonRight to change a poisoned region separated by a size of the memory chunk from a pointer factor of the release code Free into an unpoisoned state, and insert the function UnPoisonRight to a point preceding a release function existing in the program. The release function may refer to a function to return (release) the allocated memory through program execution.

Information about memory stability detected through the foregoing process may be transmitted to other testing programs (fuzzer, Test, Real World), as indicated by M3.

Figure 5:
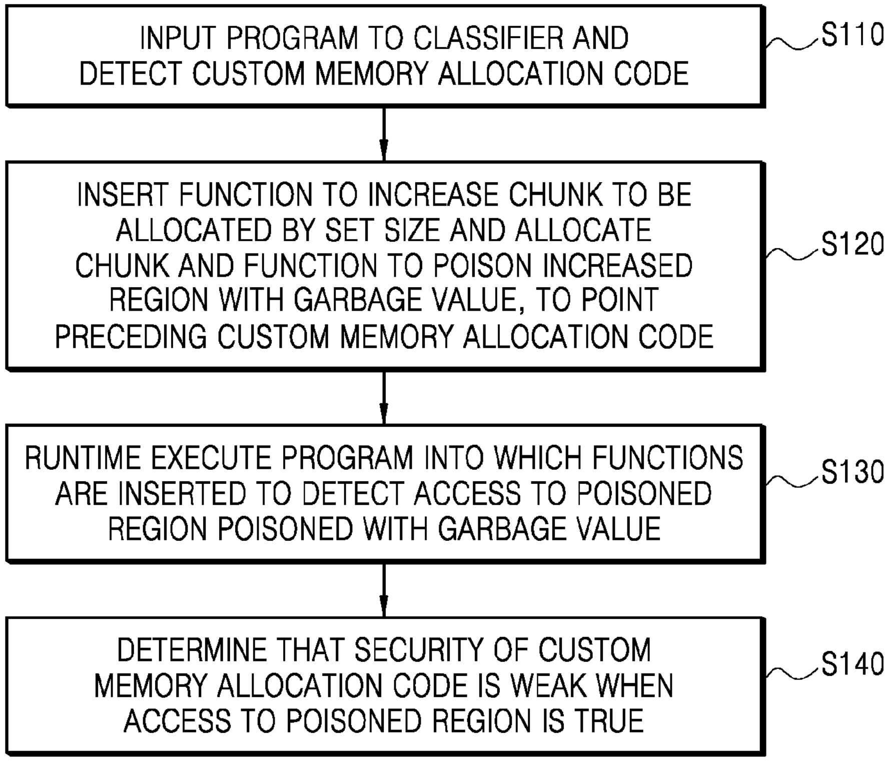
FIG. 5 is a flowchart of a memory security determination method according to embodiments.

FIG. 5 is a flowchart of a memory security determination method according to embodiments.

In operation S110, the memory stability determination apparatus 100 may detect a custom memory allocation code by inputting a program to a classifier. Data about the detected custom memory allocation code may be generated.

In operation S120, the memory stability determination apparatus 100 may insert a first function to increase a memory chunk to be allocated by a certain size and allocate the memory chunk and a second function to poison an increased region with a certain garbage value into to a position preceding the custom memory allocation code. The preceding position may refer to a position executed first in program execution. As the inserted first function and second function are executed, a set size of the memory may be allocated. For example, assuming a memory chunk of a size a, a memory chunk (region) of a size (a+b) increased by a certain size b may be allocated to the memory. With the second function for poisoning, a set garbage value may be recorded on an increased region (b). The increased region may refer to a region having a size increased in comparison to a size defined in the program. The increased region may be allocated to the right of the memory chunk because of being allocated with a greater address value than the original memory chunk.

In operation S130, the memory stability determination apparatus 100 may runtime execute the program into which the functions are inserted, thus to detect an access to a poisoned region poisoned with the garbage value. The memory stability determination apparatus 100 may detect an access to the poisoned region poisoned with the garbage value, based on whether data is recorded on the poisoned region. When data is recorded on the poisoned region, the access may be output as true (1).

In operation S140, the memory stability determination apparatus 100 may determine that the security of the custom memory allocation code is weak when the access to the poisoned region is true (1).

FIG. 7 is a table comparing a vulnerability discovered according to an embodiment with a vulnerability discovered according to the original method.

As shown in the table, according to related art, overflows occurring for custom memory allocation codes implemented as the pool pattern type, the padding pattern type, and the freelist pattern type are not detected.

However, according to the proposed disclosure, left and right overflows of the pool pattern type may be detected. Moreover, a right overflow of the padding pattern type may be detected. In addition, a right overflow of the freelist pattern type may be detected.

The apparatus described above may be implemented by a hardware element, a software element, and/or a combination of the hardware element and the software element. For example, the apparatus and elements described in the embodiments may be implemented using one or more general-purpose or special-purpose computers such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may execute an operating system (OS) and one or more software applications running on the OS. The processing device may access, store, manipulate, process, and generate data in response to execution of software. For convenience of understanding, it is described that one processing device is used, but those of ordinary skill in the art would recognize that the processing device includes a plurality of processing components and/or a plurality of types of processing components. For example, the processing device may include a plurality of processors or one processor and one controller. Alternatively, other processing configurations such as parallel processors may be possible.

Software may include a computer program, a code, an instruction, or a combination of one or more thereof, and may configure a processing device to operate as desired or independently or collectively instruct the processing device. The software and/or data may be permanently or temporarily embedded in any type of machine, component, physical device, virtual equipment, computer storage medium or device, or signal wave to be transmitted, so as to be interpreted by or to provide instructions or data to the processing device. The software may be distributed over computer systems connected through a network and may be stored or executed in a distributed manner. The software and data may be stored in one or more computer-readable recording media.

The method according to the embodiments may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM), flash memory, etc. Examples of the program command may include not only a machine language code created by a complier, but also a high-level language code executable by a computer using an interpreter. The foregoing hardware device may be configured to be operated as at least one software module to perform an operation of the embodiments, or vice versa.

While embodiments have been described by the limited embodiments and drawings, various modifications and changes may be made from the disclosure by those of ordinary skill in the art. For example, even when described techniques are performed in a sequence different from the described method and/or components such as systems, structures, devices, circuits, etc. are combined or connected differently from the described method, or replaced with other components or equivalents, an appropriate result may be achieved.

Therefore, other implementations, other embodiments, and equivalents to the claims may also fall within the scope of the claims provided below.

According to the disclosure, by inputting each code of a program to a machine-trained classifier and using whether the code corresponds to an output memory allocation code, an atypical memory allocation code included in the program may be detected and stability of the memory allocation code may be determined.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of determining stability of a memory allocation code, the method comprising:

inputting, by a memory stability determination apparatus, a program to a classifier and detecting a custom memory allocation code;

inserting, by the memory stability determination apparatus, a first function to increase a memory chunk to be allocated by a set size and allocate the memory chunk and a second function to poison an increased region with a garbage value, to a point preceding the custom memory allocation code;

runtime executing, by the memory stability determination apparatus, the program into which the first function and the second function are inserted, to detect an access to a poisoned region poisoned with the garbage value; and determining, by the memory stability determination apparatus, that security of the custom memory allocation code is weak when the access to the poisoned region is true.

2. The method of claim 1, wherein the classifier outputs whether a code corresponds to the custom memory allocation code, by using an artificial neural network trained with custom memory allocation codes.

3. The method of claim 1, wherein when the first function is executed, a sum of a first size to be allocated by the custom memory allocation code and a set second size is output.

4. The method of claim 3, wherein when the second function is executed, the memory chunk corresponding to a return value of the first function is allocated by the custom memory allocation code and the garbage value is recorded on a region of the set second size.

5. The method of claim 1, further comprising generating, by the memory stability determination apparatus, information about an allocation code having weak security as output data.

6. A memory stability determination apparatus comprising a processor and a non-volatile memory, wherein the processor is configured to:

execute instructions stored in the memory;

input a program to a classifier and detect a custom memory allocation code;

insert a first function to increase a memory chunk to be allocated by a set size and allocate the memory chunk and a second function to poison an increased region with a garbage value, to a point preceding the custom memory allocation code;

runtime execute the program into which the first function and the second function are inserted and detect an access to a poisoned region poisoned with the garbage value; and determine that security of the custom memory allocation code is weak, when the access to the poisoned region is true.

7. The memory stability determination apparatus of claim 6, wherein the classifier is configured to output whether a code corresponds to the custom memory allocation code, by using an artificial neural network trained with custom memory allocation codes.

8. The memory stability determination apparatus of claim 6, wherein when the first function is executed, a sum of a first size to be allocated by the custom memory allocation code and a set second size is output.

9. The memory stability determination apparatus of claim 8, wherein when the second function is executed, the memory chunk corresponding to a return value of the first function is allocated by the custom memory allocation code and the garbage value is recorded on a region of the set second size.

10. The memory stability determination apparatus of claim 6, wherein the processor is configured to generate information about an allocation code having weak security as output data.

11. A computer program stored on a computer-readable recording medium for executing the method according to claim 1.

* * * * *